United States Patent
Piratla et al.

(10) Patent No.: US 8,462,919 B2
(45) Date of Patent: Jun. 11, 2013

(54) SYSTEM AND METHOD FOR CALL LOGGING AND RETRIEVAL

(75) Inventors: Nischal Piratla, Fremont, CA (US); Kyu-Han Kim, Redwood City, CA (US); Angela Nicoara, San Jose, CA (US)

(73) Assignee: Deutsche Telekom AG, Bonn (DE)

( * ) Notice: Subject to any disclaimer, the term of this patent is extended or adjusted under 35 U.S.C. 154(b) by 820 days.

(21) Appl. No.: 12/556,252

(22) Filed: Sep. 9, 2009

(65) Prior Publication Data

US 2011/0058660 A1    Mar. 10, 2011

(51) Int. Cl.
*H04M 1/64* (2006.01)

(52) U.S. Cl.
USPC ............... 379/88.22; 379/88.11; 379/201.02

(58) Field of Classification Search
USPC ............... 455/418, 405, 415; 379/37, 201.01, 379/88.11, 88.22, 201.02
See application file for complete search history.

(56) References Cited

U.S. PATENT DOCUMENTS

| | | | |
|---|---|---|---|
| 5,402,474 A | 3/1995 | Miller | |
| 5,517,549 A | 5/1996 | Lee | |
| 5,982,857 A | 11/1999 | Brady | |
| 6,904,137 B2 | 6/2005 | Brandt et al. | |
| 6,950,648 B2 | 9/2005 | Pappalardo et al. | |
| 7,039,166 B1 | 5/2006 | Peterson | |
| 7,443,970 B2 | 10/2008 | Brown et al. | |
| 2002/0067821 A1* | 6/2002 | Benson et al. | 379/265.02 |
| 2002/0128036 A1* | 9/2002 | Yach et al. | 455/552 |
| 2003/0185379 A1 | 10/2003 | O'Connor | |
| 2005/0117729 A1 | 6/2005 | Reding et al. | |
| 2010/0027777 A1* | 2/2010 | Gupta et al. | 379/210.01 |

FOREIGN PATENT DOCUMENTS

EP    0568770 A2    11/1993

OTHER PUBLICATIONS

European Patent Office, Extended European Search Report in European Patent Application No. 10009376.4 (Dec. 6, 2010).

* cited by examiner

*Primary Examiner* — Gerald Gauthier
*Assistant Examiner* — Simon King
(74) *Attorney, Agent, or Firm* — Leydig, Voit & Mayer, Ltd.

(57) ABSTRACT

A system and method for call logging and retrieval includes receiving a call log of a first call made by a user. The call log of the first call may include, for example, the start and end time of the call, and/or the like. The context for the call is provided by the user. A call record is stored for each call of a number of calls made to and from the user. The record for the first call includes the call log of the first call and the context for the first call.

13 Claims, 9 Drawing Sheets

US 8,462,919 B2

SYSTEM AND METHOD FOR CALL LOGGING AND RETRIEVAL

TECHNICAL FIELD

The present invention relates generally to telecommunications and in particular but not exclusively, to an apparatus, method, system, and manufacture for logging calls with a user-generated context and retrieval of the calls using search and query techniques.

BACKGROUND

Writing a note about a phone call, during or after the conversation, is a common occurrence in communication scenarios. Such an action is heavily used in customer-support service call centers.

One example of a typical call center logging and retrieval scenario may occur as follows. First, a call is made or received to/from the customer. The details of the customer are taken down for authentication and/or future marketing purposes. Later, when a call is received from the customer or made to a customer, the previous information is retrieved using a query on information such as a last name or phone number, etc. Subsequently, the call center personnel update the customer information with the contents of previous discussions and follows up the matter.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
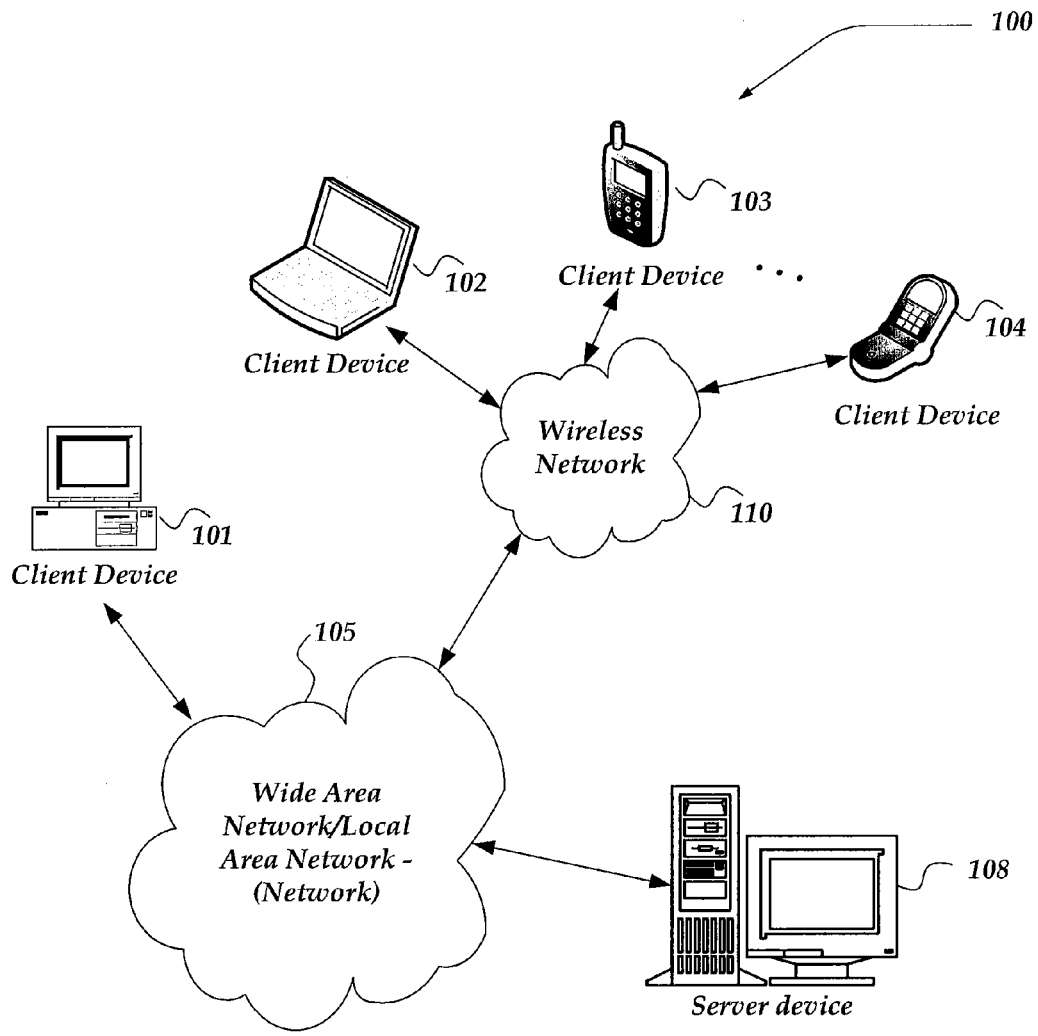
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, certain embodiments of the invention are related to a system and method for call logging and retrieval including receiving a call log of a first call made by a user. The call log of the first call may include, for example, the start and end time of the call, and/or the like. The context for the call is provided by the user. A call record is stored for each call of a number of calls made to and from the user. The record for the first call includes the call log of the first call and the context for the first call.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, and server device 108.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

In one embodiment, client devices 101-104 may further provide information useable to detect a location of the client device. Such information may be provided in a message, or sent as a separate message to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device. Information provided either as part of a user account generation, a purchase, or other activity may result in providing various customer profile information. Such customer profile information may include, but is not limited to demographic information about a customer, and/or behavioral information about a customer and/or activities. In one embodiment, such customer profile information might be obtained through interactions of the customer with a brick-and-mortar service, or dynamically tracked based on a usage of the telecommunication carrier's products/services. However, customer profile information might also be obtained by monitoring activities such as purchase activities, network usage activities, or the like, over a network.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple server device 108 and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Server device 108 includes a network computing device that is configured to perform call logging and retrieval functions as described in detail below.

Devices that may operate as server device 108 include, but are not limited to personal computers, desktop computers, multiprocessor systems, microprocessor-based or programmable consumer electronics, network PCs, servers, network appliances, and the like.

Although server device 108 is illustrated as a distinct network device, the invention is not so limited. For example, a plurality of network devices may be configured to perform the operational aspects of server device 108.

Illustrative Client Environment

Figure 2:
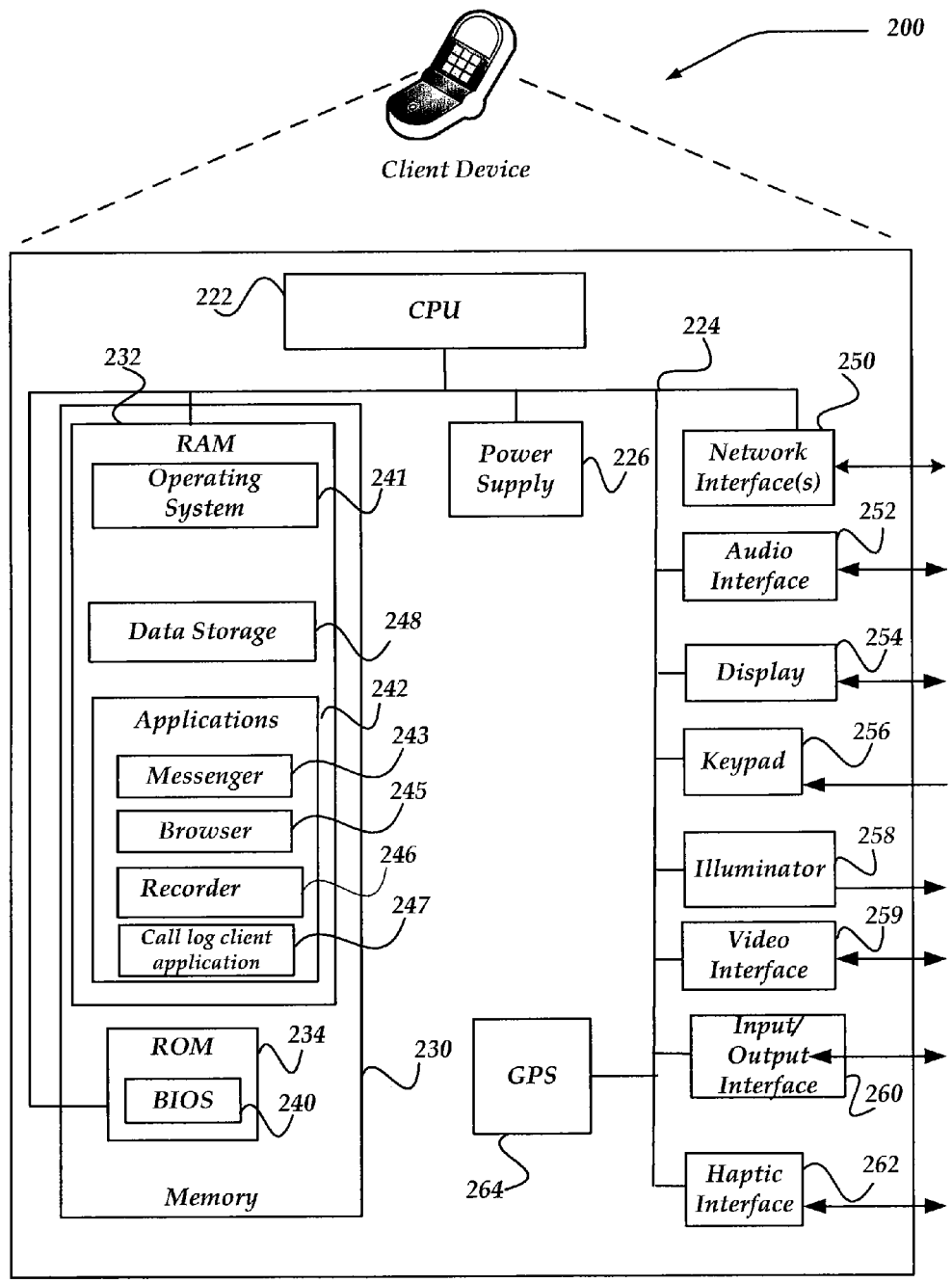
FIG. 2 illustrates a block diagram of an embodiment of a client device of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light. In one embodiment, video interface 259 may interact with recorder 246 application to manage such actions.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, voice-to-text conversion software, voice recognition software, caller ID applications, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Applications 242 may include call log client application 247. In some embodiments, client device 247 may include processor-executable code to perform at least one of the methods illustrated in FIG. 6, FIG. 7, and/or FIG. 8.

Illustrative Network Device Environment

Figure 3:
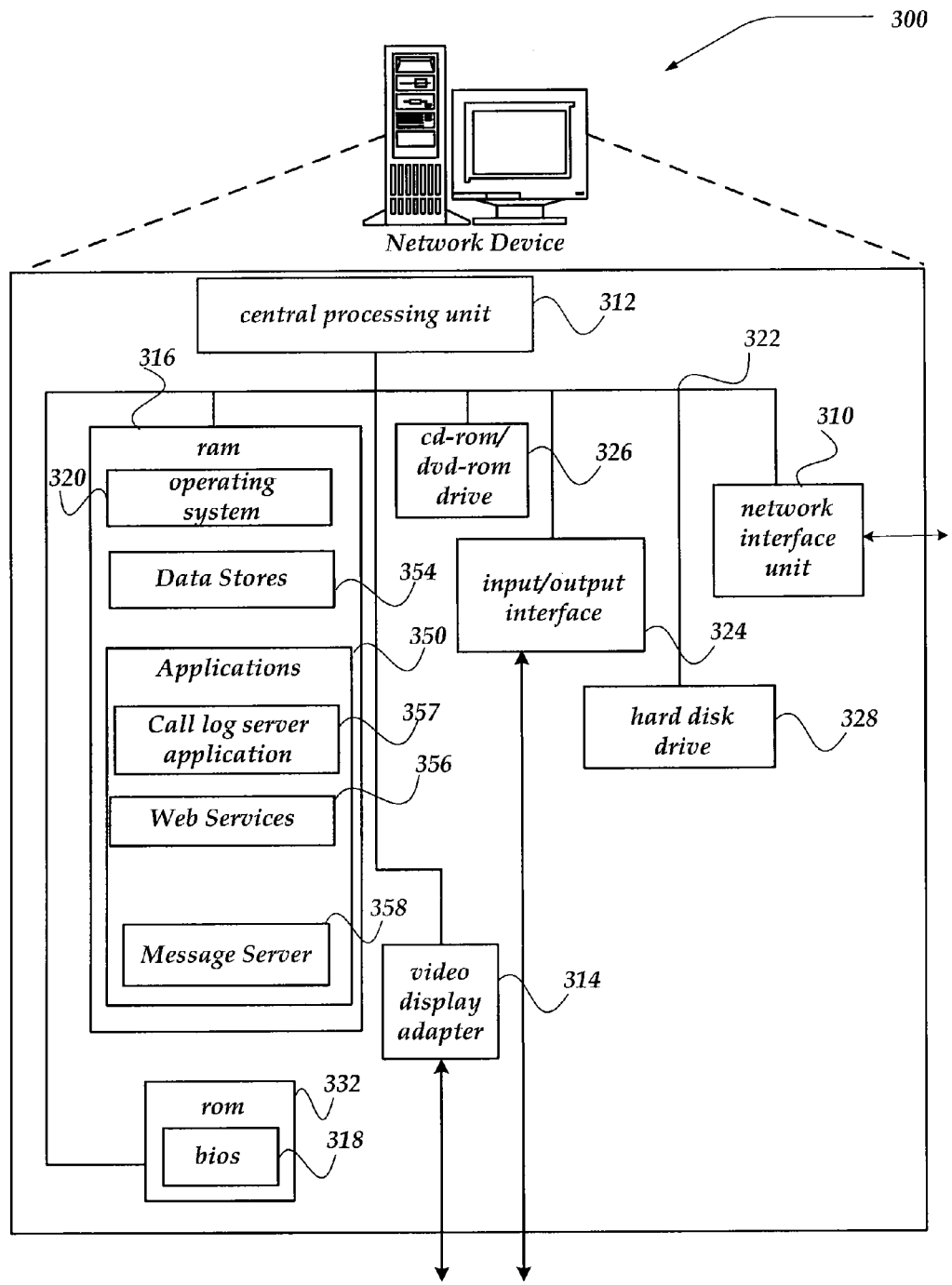
FIG. 3 shows a block diagram of an embodiment of a network device of FIG. 1.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, server device 108 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers, profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and call log server application 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

One embodiment of a process that may be performed by call log server application 357 is described further below in conjunction with FIG. 4.

Illustrative Processes

Figure 4:
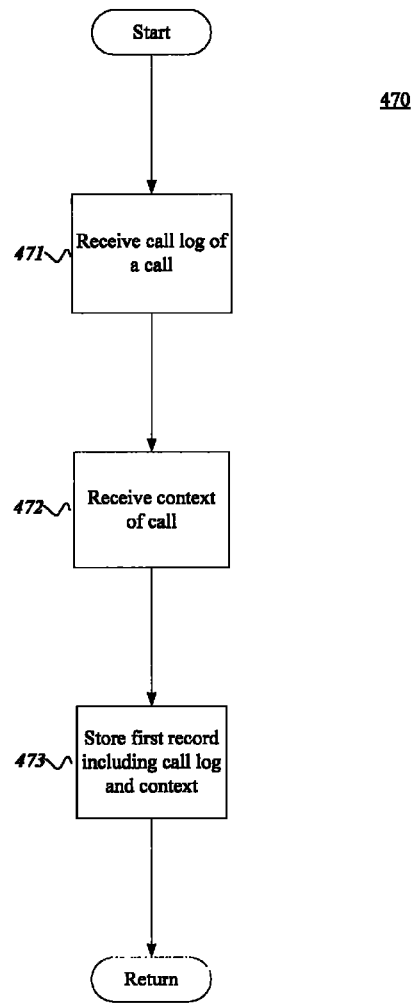
FIG. 4 illustrates a flow chart of an embodiment of a process of call logging.

FIG. 4 illustrates a flow chart of an embodiment of a process (470) of call logging. Process 470 may be performed by an embodiment of server device 108 of FIG. 1. After a start block, the process proceeds to block 471, where a call log of a call is received. The call log may include, for example, the telephone number, duration, date, time, type, and/or the like. The process then moves to block 472, where the context of the call is received. The context is provided by the user. In some embodiment, the context is provided by the user in response to a prompt for the context of the call. The process then advances to block 473, where a call record is stored for the call. The call record includes the call log and the context. The process then proceeds to a start block, where other processing is resumed.

Process 470 may be repeated for each call made or received by the user, so that the server device includes a number of call records that may subsequently be searched or queried, as explained in greater detail below.

Figure 5:
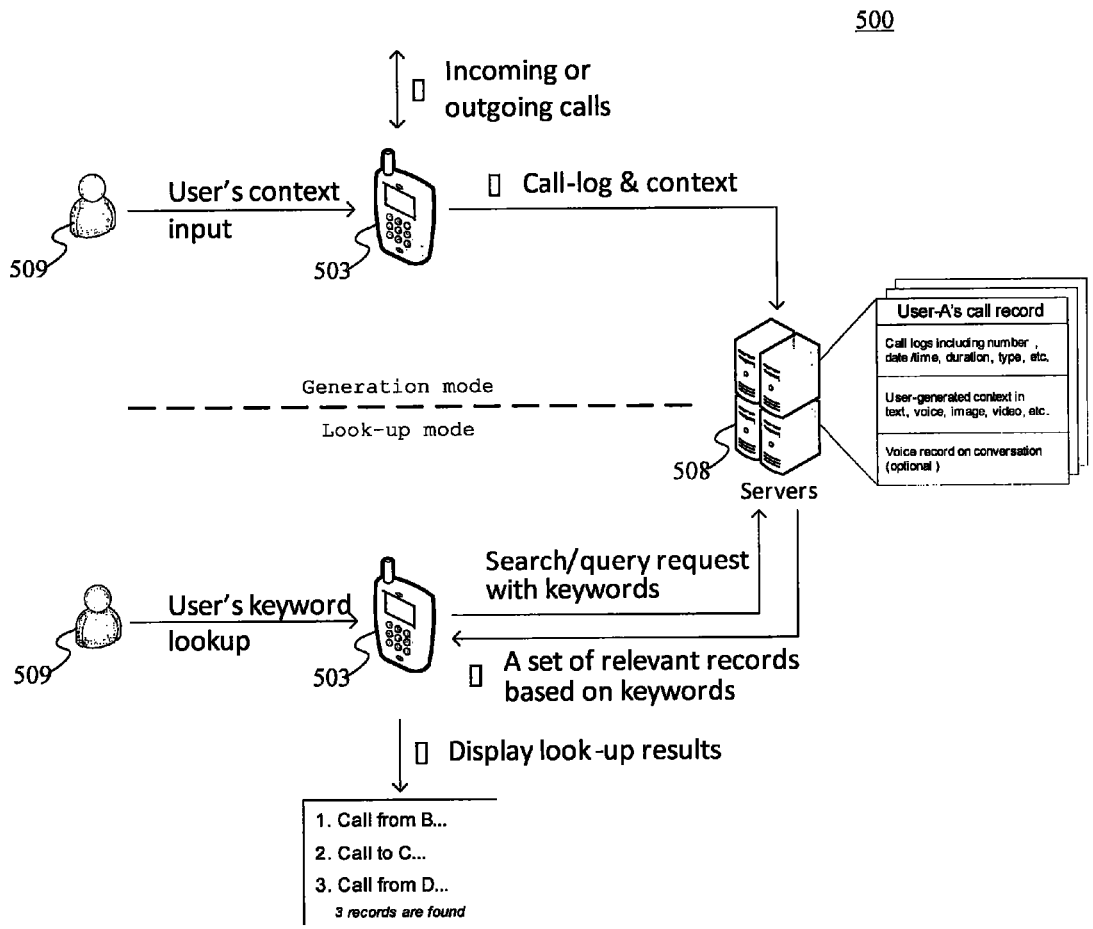
FIG. 5 shows a block diagram of an embodiment of the system of FIG. 1.

FIG. 5 shows a block diagram of an embodiment of system 500, which may be employed as an embodiment of system 100 of FIG. 1. System 500 includes client device 503 and servers 508. Servers 508 operate together as an embodiment of server device 108 of FIG. 1.

In some embodiments, client device 503 is a smart mobile phone. In other embodiments, client device 503 is a telephone that operates via voice over internet protocol (VOIP) or other method in which the telephone services operate over a computer network. Although the same device, client device 503, is shown for both the call logging ("generation mode") and call retrieval ("look-up mode"), different devices may be used for each. For generation mode, the client device is a smart mobile phone, or a telephone that operates via VOIP or another method in which the telephone services operate over a computer network, or the like. For look-up mode, in some embodiments, any suitable device that can communicate over a network to servers 508 may be employed. For example, in some embodiments, the look-up mode can be performed with any browser that connects to the internet. In some embodiments, the user can perform the search from a browser by logging into the operator's portal, and logging into the user's profile online, and then performing the search. For the sake of simplicity, subsequent discussion will refer to a single client device as performing both functions, but it is understood based on the preceding discussion that a different device may be used in look-up mode.

In the generation mode, when client device 503 makes or receives a call, it creates a record at the end of the call. The record includes a call log, user-generated context, and may optionally also include the voice call. The call log includes call details, such as call type (incoming/outgoing, video/voice, international/domestic, etc.), caller and callee's phone number, time and date of the call, call duration, profile of the caller/called (if exists in address book), and/or the like. Instead of the caller and/or callee phone number, some other identification of the caller and/or callee, such as name, may be provided.

At the end of the call, or at another suitable time, client device 503 prompts user 509 for the context of the call. Context can be entered using word processor in client device 503, voice input that can be translated to text by any application on client device 503 or by servers 508, or hyper-links to exchanged pictures. In some embodiments, any of these methods, and others, may be used at the user's options. In other embodiments, only one particular method of entering the context is implemented.

According to one example, in generation mode, a user 509 speaks to another person about plans to do something, and they talk about any interesting topic, or they exchange their vacation pictures/files. User 509 can create a context around the plans or around the topic or anything else that user 509 can remember about the conversation or related to the conversation. The context is used both to provide the user with additional information about the call or additional information related to the call, and is also used to help find the call if a subsequent search or query is made attempting to find the call. If the user was asked to do something in the call, the user may provide a summary about what the user was asked to do in the context. The user might instead simply enter a keyword related to the call. For example, if the user was asked on the call to pick up milk, the user may simply enter "milk" as the context. Or the user may provide more specific details as to what he was asked to do, such as, "buy milk today before 7 P.M."

In some embodiments, the prompt is a screen display, on a screen of client device 503, with request displayed on the screen asking the user to provide the context. If client device 503 is a smart mobile device, the context may be provided in a number of ways, including text, attaching a file, or the like. In some embodiments, the user provides input via a word processor. In some embodiments, client device 503 is equipped with a camera, the user may respond by taking a picture or a video with client device 503, with the picture(s) and/or video taken stored as the context. It is also possible to provide more than one type of content—for example, a user may take a picture to remind him of the details of the call, and also include a text to make it easier to subsequently search for the call. In some embodiments, client device 503 is a VOIP phone, and the prompt for the user to provide the context is made verbally, and the user may respond verbally. Client device 503 then converts the context provided verbally by the user into text.

In some embodiments, the voice call itself is included in the call record. If the call is logged then the recorded voice call audio can be logged as is, or translated to text using voice recognition and stored in servers 508.

In some embodiments, each user 509 may decide whether or not the user wants voice records to be stored. Some users may not wish call records to be stored remotely, even if the voice records are used only for this service so that the call may be searched and retrieved based on the voice records. Accordingly, in these embodiments, call records are either stored or not for each user depending on each user's preferences.

The call record is then stored in a remote server in servers 508.

In the look-up mode, user 509 of client device 503 searches for the calls related to the keyword(s), over the records in the server that were previously added during the generation mode. This search can also be a structured query or a simple search over the whole content. The client enters the search or query on client device 503, client device 503 transmits the search or query to servers 508, and servers 508 perform the search or query on the stored call records. Keyword search refers to a keyword match. A keyword search may be preferred when the user knows the exact word used in the context of the call, and wants to specifically identify a call based on the keyword used, and/or other exact parameter such as caller, callee, date of call, time of call, and the like, in a precise way. A keyword query refers to a more intelligent natural language based search that may include, among other things, synonyms for the word searched rather than just searching for the literal keyword itself. The user can enter a natural language query such as, "What is the appointment between 1 PM to 3 PM?" Natural language processing techniques known in the art may be used to implement the keyword query. In some embodiments, the query can be entered by several means, such as by text, by accessing interfaces on the device to initiate the search, or by a voice command, such as saying, "Retrieve all calls made yesterday" into the phone.

The call details and user-generated context can be searched, as well as the voice record in embodiments in which the voice record is converted to text. All of the call records for the user may be searched, based on the parameters of the search or query made. A set of relevant records are then sent back to client device 503 by servers 508. These records are displayed on client device 503 in a short or complete form on the device screen. In some embodiments, the results are ranked by relevance, and the results are displayed based in an order that corresponds to their ranking. In some embodiment, the order displayed on the screen is adjustable, so that it may be displayed by relevance, and user 509 can adjust the order to be ordered based on some other parameter, such as by time of call, by caller or callee, or the like.

In some embodiments, the content around the search/query results include related offerings of products/services to the end user of this service. In other embodiments, the content does not include such offerings. In some embodiments, the display of results shows, for each result, certain call details, such as time and date of call, caller and callee, as well as at least a portion of the material that included the keyword, which may be part or all of the context including the keyword, for example. For example, if the context is short, the entire context may be displayed. If the context is long, then the displayed result may include a small portion of the context that includes the keyword. In embodiments in which the voice record is generated and converted to text, if the keyword appears on the voice record, a relevant portion of the phone conversation that includes the keyword may be displayed.

For example, if the user does a keyword search for Germany, the results of the search may include all calls made to and from Germany; all calls that include the word "Germany" in the context; and if voice record text is included, all phone conversations in which the word Germany was used in the conversation, with the results listed in order according to relevance ranking. Similarly, if a keyword search is done for "Monday", the results may include all incoming and outgoing calls that were made or received on a Monday; any calls with a context that include the word "Monday"; and if voice record text is included, all phone conversations in which the word "Monday" was used in the conversation, with the results listed in order according to relevance ranking For a query, a user could request "All the calls from Germany between 1 PM to 5 PM on Monday the $17^{th}$ of Aug. 2009."

The user may select any of the displayed results. If so, the entire call record is displayed. If the call record includes larger files such as recorded audio of the call, context provided as video, or the like, the call record may display a link to the larger file, which the user may select to access the file.

Figure 6:
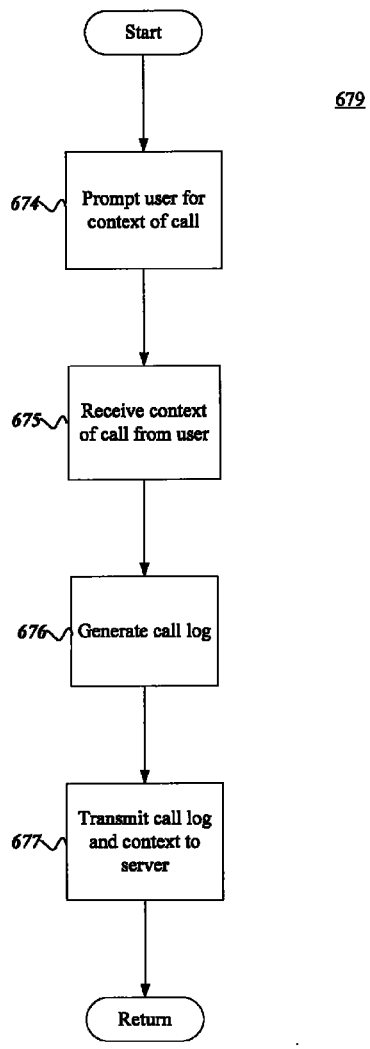
FIG. 6 illustrates a flow chart of an embodiment of a process that may be employed by the client device of FIG. 5.

FIG. 6 illustrates a flow chart of an embodiment of a process (679) that may be employed by client device 503 of FIG. 5. After a start block, the process proceeds to block 674, where the user is prompted for a context of a call that was made or received by the user. The process then moves to block 675, where the context of the call is received from the user. The process then advances to block 676, where a call log is generated. The call log includes at least a time associated with the call. The process then proceeds to block 677, where the call log and context are transmitted to the server.

Figure 7:
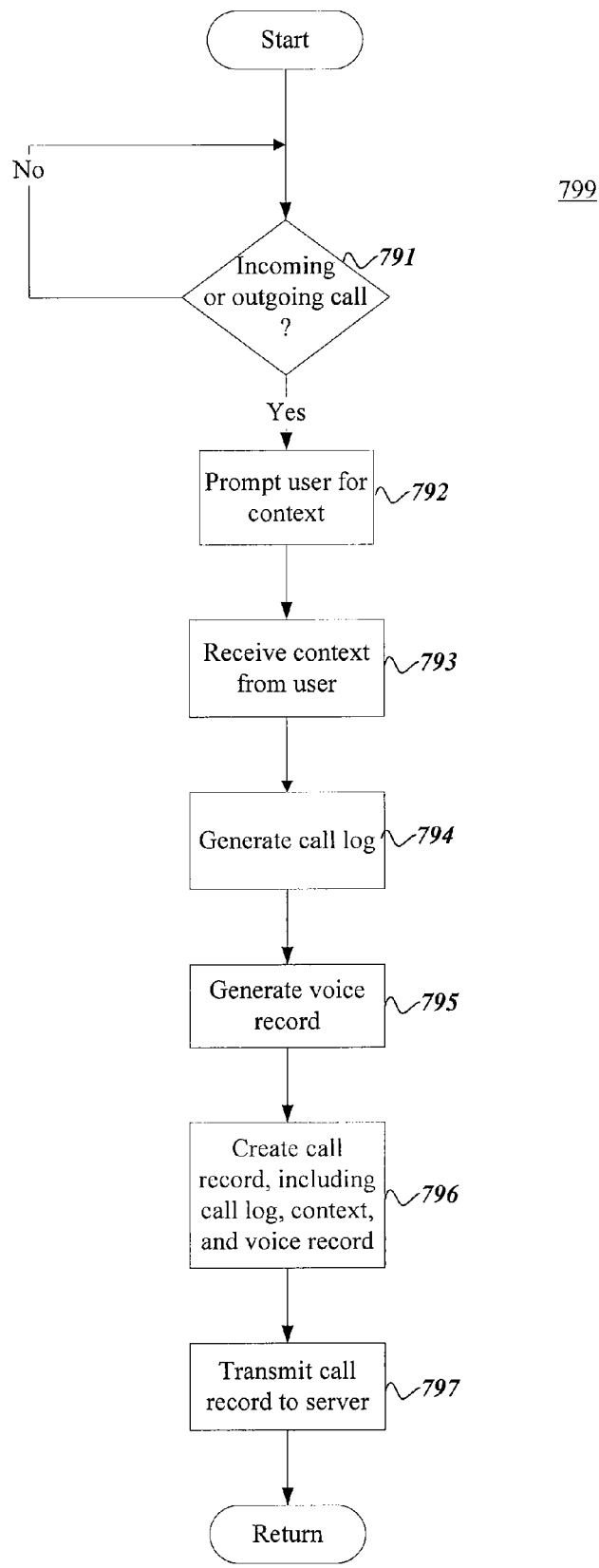
FIG. 7 shows a flow chart of an embodiment of a process for call logging.

FIG. 7 shows a flow chart of an embodiment of a process (779) for call logging, which may be employed by client device 503 of FIG. 5. After a start block, the process proceeds to decision block 791, where a determination is made as to whether an incoming call is received or an outgoing call is made on the client device. If not, the process remains as decision block 791, where calls continue to be monitored. If the determination at decision block 791 is positive, the process moves to block 792, where the user is prompted for a context of a call that was made or received by the user. The process then moves to block 793, where the context of the call is received from the user.

The process then advances to block 794, where a call log is generated. As previously discussed, the call log may include call details such as call type (incoming/outgoing, video/voice, etc.), caller and called's phone number, time and date of the call, call duration, profile of the caller/called (if exists in address book), and/or the like. In some embodiments, software in the phone stores the data, based on the operator's network where the caller ID is used, and the phone takes the caller ID technology and stores it locally. The call details can accordingly be read locally from the phone. In these embodiments, the call duration and the other call details are available from software within the phone.

The process then proceeds to block 795, where a voice record is generated. As previously discussed, in some embodiments, the voice record is maintained as recorded audio, and in other embodiments, the audio is converted to text, and the text is maintained as the voice record. The process then moves to block 796, where a call record is created, including the call log, context, and voice record. The process then advances to block 797, where the call record is transmitted to the server. The process then proceeds to a return block, where other processing is resumed.

Figure 8:
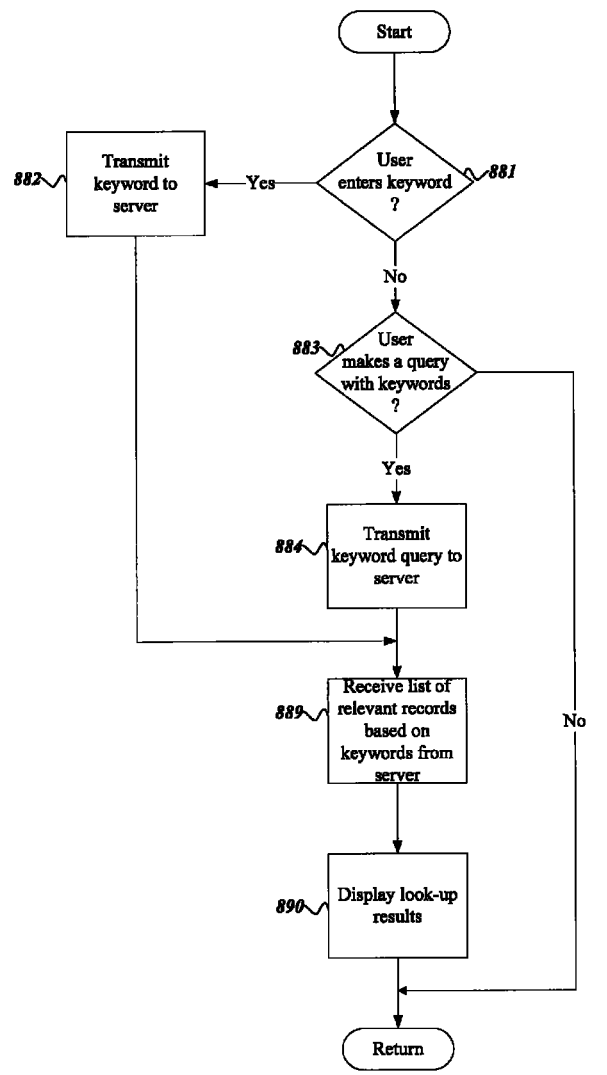
FIG. 8 illustrates a flow chart of an embodiment of a process for call log look-up that may be performed by an embodiment of the client device of FIG. 1.

FIG. 8 illustrates a flow chart of an embodiment of a process (880) for call log look-up that may be performed by an embodiment of the client device 503 of FIG. 5. After a start block, the process proceeds to decision block 881, where a determination is made as to whether a user has entered a keyword as part of a keyword search. If not, the process moves to decision block 884, where a determination is made as to whether a user made a query with one or more keywords. If so, the process proceeds to block 884, where the keyword query is transmitted to the server. The process then proceeds to block 889, where a list of relevant records based on the keyword(s) is received from the server. The process advances to block 890, where the look-up results are displayed. The process then moves to a return block, where other processing is resumed.

If the decision at decision block 883 is negative, the process advances to the return block, whether other processing is resumed. If the process at decision block 881 is positive, the process proceeds to block 883, where the keyword is transmitted to the server. The process then moves to block 889.

Figure 9:
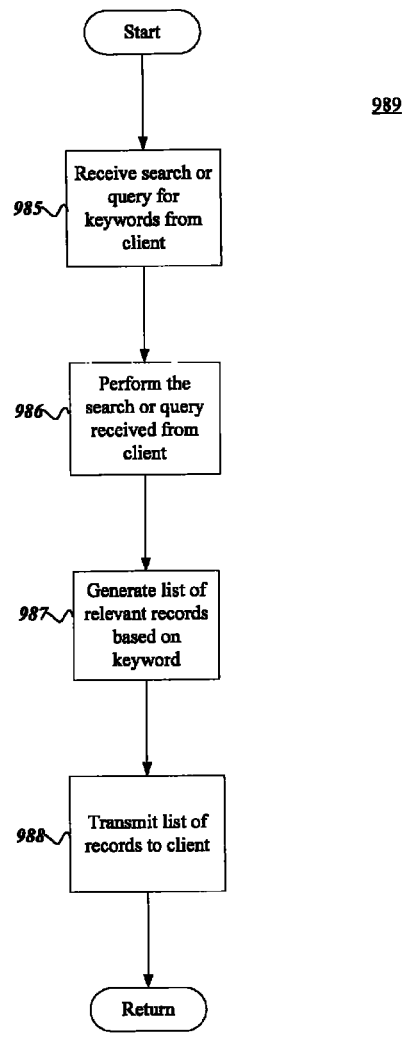
FIG. 9 shows a flow chart of an embodiment of a process for call log look-up that may be employed by an embodiment of the server device of FIG. 1, in accordance with aspects of the present invention.

FIG. 9 shows a flow chart of an embodiment of a process (989) for call log look-up that may be employed by an embodiment of the server. For example, the server may perform process 989 after a keyword search or query is transmitted to the server device by block 882 or 884 of process 880 of FIG. 8.

After a start block, the process proceeds to block 985, where a search or query for keywords is received from a client device. The process then moves to block 986, where the search or query received from the client is performed. The process then advances to block 987, where a list of relevant call records is generated based on the keyword. The process then proceeds to block 988, where the list of records is transmitted to the client. The process then moves to a return block, where other processing is resumed.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A non-transitory processor-readable medium having processor-executable code encoded therein, which when executed by one or more processors, enables actions for call logging, comprising:
   receiving a call log of a call associated with a user, wherein the call log of the call includes a time of the call, a date of the call, an identification of a caller of the call, and an identification of a callee of the call;
   receiving a context for the call, wherein the context for the call is provided by the user;
   storing a call record corresponding to the call including the call log and the context, wherein the record is one of a plurality of call records associated with the user;
   performing a search or query of the plurality of call records in response to receiving a search or query request from the user; and
   displaying results of the performed search or query.

2. The processor-readable medium of claim 1, wherein each of the plurality of call records associated with the user corresponds to an incoming call received by the user or an outgoing call made by the user.

3. The processor-readable medium of claim 1, wherein the context for the call is provided by the user in response to a prompt for the context for the call.

4. The processor-readable medium of claim 1, wherein the context includes at least one of text, voice, image, or video.

5. The processor-readable medium of claim 1, the actions further comprising:
  receiving a voice record of the call, wherein the call record further includes the voice record of the call.

6. The processor-readable medium of claim 5, wherein the voice record is an audio recording of the call, wherein the audio recording of the call includes a conversation between the caller and the callee.

7. The processor-readable medium of claim 1, the actions further comprising:
  receiving an audio recording of the call;
  converting the audio recording of the call to text; and
  storing the text as part of the call record.

8. A computer-implemented method for call logging, comprising:
  receiving a call log of a call associated with a user, wherein the call log of the call includes a time of the call, a date of the call, an identification of a caller of the call, and an identification of a cane of the call;
  receiving a context for the call, wherein the context for the call is provided by the user;
  storing, at a server device, a call record corresponding to the call including the call log and the context, wherein the record is one of a plurality of call records associated with the user;
  performing a search or query of the plurality of call records in response to receiving a search or query request from the user; and
  displaying results of the performed search or query.

9. The method of claim 8, further comprising:
  receiving a voice record of the call, wherein the call record further includes the voice record of the first call.

10. The method of claim 8, further comprising:
  receiving an audio recording of the call;
  converting the audio recording of the call to text; and
  storing the text as part of the call record.

11. A server device for call logging, comprising:
  a memory that is arranged store processor-executable code; and
  a processor that is arranged to execute the processor-executable code to enable actions, comprising:
    receiving a call log of a call associated with a user, wherein the call log of the call includes a time of the call, a date of the call, an identification of a caller of the call, and an identification of a callee of the call;
    receiving a context for the call, wherein the context for the call is provided by the user;
    storing a call record corresponding to the call including the call log and the context, wherein the record is one of a plurality of call records associated with the user;
    performing a search or query of the plurality of call records in response to receiving a search or query request from the user; and
    displaying results of the performed search or query.

12. A non-transitory processor-readable medium having processor-executable code encoded therein, which when executed by one or more processors, enables actions for call logging, comprising:
  receiving a call log of a call associated with a user, wherein the call log of the call includes at least one of a time of the call, a date of the call, an identification of a caller of the call, or an identification of a callee of the call;
  receiving a context for the call, wherein the context for the call is provided by the user;
  storing a call record corresponding to the call including the call log and the context, wherein the record is one of a plurality of call records associated with the user;
  performing a search or query of the plurality of call records in response to receiving a search or query request from the user;
  displaying results of the performed search or query; and
  receiving a voice record of the call, wherein the call record further includes the voice record of the call.

13. A non-transitory processor-readable medium having processor-executable code encoded therein, which when executed by one or more processors, enables actions for call logging, comprising:
  receiving a call log of a call associated with a user, wherein the call log of the call includes at least one of a time of the call, a date of the call, an identification of a caller of the call, or an identification of a callee of the call;
  receiving a context for the call, wherein the context for the call is provided by the user;
  storing a call record corresponding to the call including the call log and the context, wherein the record is one of a plurality of call records associated with the user;
  performing a search or query of the plurality of call records in response to receiving a search or query request from the user;
  displaying results of the performed search or query;
  receiving an audio recording of the call;
  converting the audio recording of the call to text; and
  storing the text as part of the call record.

* * * * *